(12) United States Patent
Hayashi

(10) Patent No.: US 11,148,294 B2
(45) Date of Patent: Oct. 19, 2021

(54) AUTONOMOUSLY ACTING ROBOT THAT MAINTAINS A NATURAL DISTANCE

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 148 days.

(21) Appl. No.: 16/283,818

(22) Filed: Feb. 25, 2019

(65) Prior Publication Data

US 2019/0184572 A1 Jun. 20, 2019

Related U.S. Application Data

(63) Continuation of application No. PCT/JP2017/031890, filed on Sep. 5, 2017.

(30) Foreign Application Priority Data

Sep. 8, 2016 (JP) .............................. JP2016-175163

(51) Int. Cl.
*B25J 9/16* (2006.01)
*G05D 1/02* (2020.01)
(Continued)

(52) U.S. Cl.
CPC .............. *B25J 9/1697* (2013.01); *B25J 5/00* (2013.01); *B25J 5/007* (2013.01); *B25J 9/1653* (2013.01);
(Continued)

(58) Field of Classification Search
CPC ...... B25J 9/1697; B25J 9/1664; B25J 9/1653; B25J 5/00; B25J 5/007; B25J 13/08; G05D 1/02
See application file for complete search history.

(56) References Cited

U.S. PATENT DOCUMENTS 6,565,371 B1 5/2003 Watanabe
2002/0049515 A1* 4/2002 Osawa ..................... A63H 3/28
700/245
(Continued)

FOREIGN PATENT DOCUMENTS

JP H3-6710 A 1/1991
JP 00/67959 A1 11/2000
(Continued)

OTHER PUBLICATIONS

Written Opinion of the ISA in PCT/JP2017/031890, dated Nov. 28, 2017, 17pp.
(Continued)

*Primary Examiner* — Khoi H Tran
*Assistant Examiner* — Nhi Q Bui
(74) *Attorney, Agent, or Firm* — Hauptman Ham, LLP

(57) ABSTRACT

A robot includes a filming unit that films a periphery, and a movement control unit that controls a distance from a filmed target object in accordance with a size of the target object. The robot may further include an operation control unit that controls an operation of a head portion, and a recognizing unit that recognizes a face of the filmed target object. The operation control unit may control the operation of the head portion so that a line of sight of the head portion reaches an angle of looking up directed at the face of the target object. The movement control unit may control the distance from the target object in accordance with a height of the target object.

20 Claims, 11 Drawing Sheets

(51) Int. Cl.
*B25J 5/00* (2006.01)
*B25J 13/08* (2006.01)
(52) U.S. Cl.
CPC ............ *B25J 9/1664* (2013.01); *B25J 13/08* (2013.01); *G05D 1/02* (2013.01)

(56) References Cited

U.S. PATENT DOCUMENTS

| | | | | |
|---|---|---|---|---|
| 2007/0192910 | A1* | 8/2007 | Vu | B25J 19/06 |
| | | | | 700/245 |
| 2012/0209433 | A1* | 8/2012 | Paz Rodriguez | B25J 11/0005 |
| | | | | 700/259 |
| 2015/0094851 | A1* | 4/2015 | Kawabe | B25J 11/0005 |
| | | | | 700/246 |
| 2017/0372705 | A1* | 12/2017 | Lin | G06F 21/32 |

FOREIGN PATENT DOCUMENTS

| | | |
|---|---|---|
| JP | 2000-323219 A | 11/2000 |
| JP | 2003-275976 A | 9/2003 |
| JP | 2004-230480 A | 8/2004 |
| JP | 2011-54082 A | 3/2011 |

OTHER PUBLICATIONS

International Search Report in PCT/JP2017/031890, dated Nov. 28, 2017. 4pp.
Office Action in JP Application No. 2018-538413, dated Nov. 13, 2018. 5pp.
Office Action in CN Application No. 201780054987.7, dated May 17, 2021. 16pp.

\* cited by examiner

AUTONOMOUSLY ACTING ROBOT THAT MAINTAINS A NATURAL DISTANCE

RELATED APPLICATIONS

The present application is a continuation of International Application No. PCT/JP2017/031890, filed Sep. 5, 2017, which claims priority from Japanese Application No. 2016-175163, filed Sep. 8, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

Development of an autonomously acting robot that provides interaction with and solace to a human, such as a humanoid robot or a pet robot, is being carried out (for example, refer to Patent Document 1). Although this kind of robot operates in accordance with a control program, the robot causes behavior to evolve by autonomously learning based on a peripheral situation, whereby the robot may become an existence near that of a living organism.

CITATION LIST

Patent Literature

Patent Document 1: JP-A-2000-323219

SUMMARY OF INVENTION

Technical Problem

Although this kind of robot technology has advanced swiftly in recent years, the technology has not advanced so far as to realize a presence as a pet-like companion. However high-performance a robot may be, the robot does not have the flesh and blood warmth of a living being. This is because a robot is designed based on this kind of fixed idea, and operation control is carried out.

The invention, having been completed based on a recognition of the heretofore described problem, has a main object of providing control technology for providing a robot with vitality.

Solution to Problem

One aspect of the invention is an autonomously acting robot. The robot includes a filming unit that films a periphery, and a movement control unit that controls a distance from a filmed target object in accordance with a size of the target object.

Another aspect of the invention is an autonomously acting robot action control program. The program causes a computer to realize a function of acquiring a filmed image of a periphery of a robot, a function of identifying a predetermined target object in the filmed image, a function of computing a positional relationship that the robot and a filmed target object should adopt in accordance with a size of the target object, and a function of controlling movement of the robot so as to realize the computed positional relationship.

Advantageous Effects of Invention

According to the invention, control technology for providing a robot with vitality can be provided.

DESCRIPTION OF EMBODIMENTS

Figure 1A:
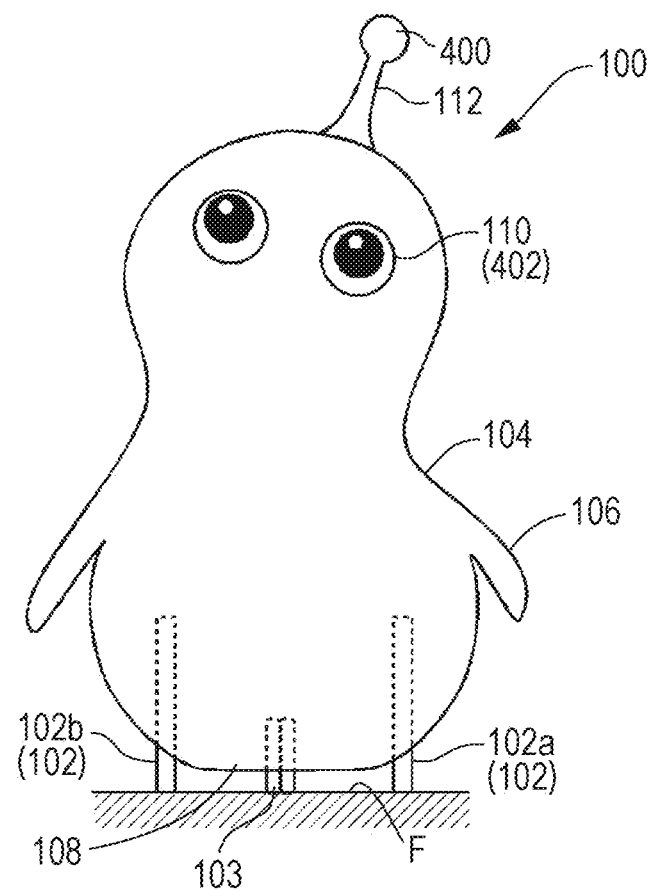
FIG. 1A and FIG. 1B are drawings representing external views of a robot according to an embodiment.

Hereafter, referring to the drawings, an embodiment of the invention will be described in detail. In the following description, for the sake of convenience, a positional relationship of each structure may be expressed with a state shown in the drawings as a reference. Also, the same reference signs will be allotted to practically identical components in the following embodiment and modified examples thereof, and a description thereof may be omitted as appropriate.

Figure 1B:
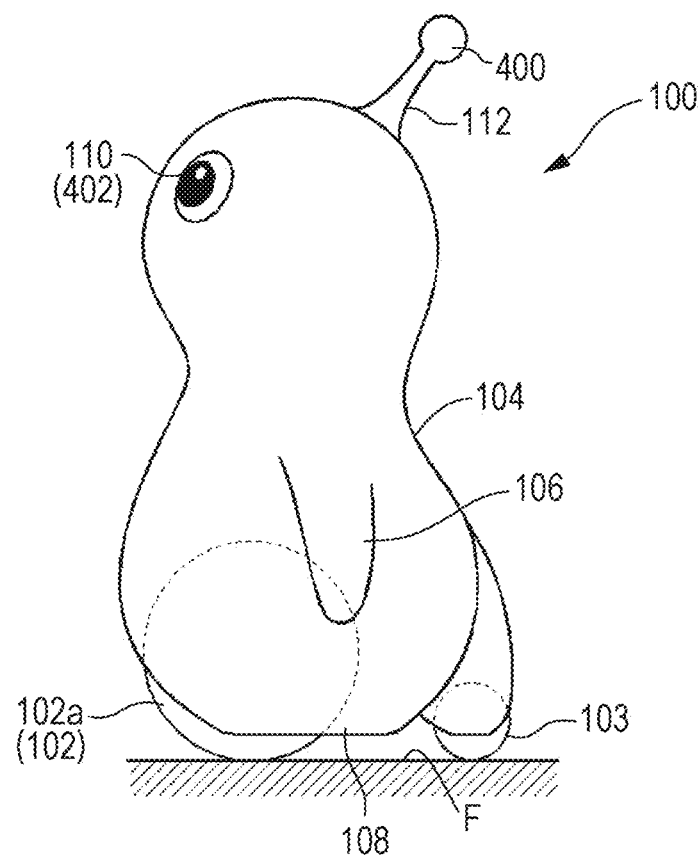

FIG. 1A and FIG. 1B are drawings representing external views of a robot 100 according to the embodiment. FIG. 1A is a front view, and FIG. 1B is a side view.

The robot 100 in this embodiment is an autonomously acting robot that determines an action or a gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with an ease of mind and a pleasant tactile sensation.

A total weight of the robot 100 is 15 kilograms or less, preferably 10 kilograms or less, and more preferably still 5 kilograms or less. A majority of babies start to walk by themselves 13 by months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism and a linking mechanism) to be described hereafter. A greater portion of each wheel is hidden by the body 104 when traveling too, but when each wheel is completely housed in the body 104, the robot 100 is in a state of being unable to move. That is, the body 104 descends, and sits on a floor surface, in accompaniment to an operation of the wheels being housed. In the sitting state, a flat seating face 108 (a grounding bottom face) formed in a bottom portion of the body 104 comes into contact with the floor surface F.

The robot 100 has two arms 106. The arms 106 do not have a function of gripping an object. The arms 106 are capable of performing simple actions such as raising, waving, and oscillating. The two arms 106 can also be individually controlled.

Two eyes 110 are provided in a head portion front surface (a face) of the robot 100. A high resolution camera 402 is incorporated in eye 110. The eye 110 is also capable of an image display using a liquid crystal element or an organic EL element. The robot 100 incorporates a speaker, and can also emit simple speech. A horn 112 is attached to an apex portion of the robot 100. As the robot 100 is lightweight, as heretofore described, a user can also lift up the robot 100 by grasping the horn 112.

An omnidirectional camera 400 (a first camera) is incorporated in the horn 112 of the robot 100 of this embodiment. The omnidirectional camera 400 can film in all directions up and down and left and right (360 degrees: in particular, practically all regions above the robot 100) at one time using a fisheye lens (refer to FIG. 8). The high resolution camera 402 (a second camera) incorporated in the eye 110 can film only in a direction in front of the robot 100. A filming range of the omnidirectional camera 400 is wide, but resolution is lower than that of the high resolution camera 402.

In addition to this, the robot 100 incorporates various sensors, such as a temperature sensor (thermosensor) that converts a peripheral temperature distribution into an image, a microphone array having a multiple of microphones, a form measuring sensor (depth sensor) that can measure a form of a measurement target, and an ultrasonic wave sensor.

Figure 2:
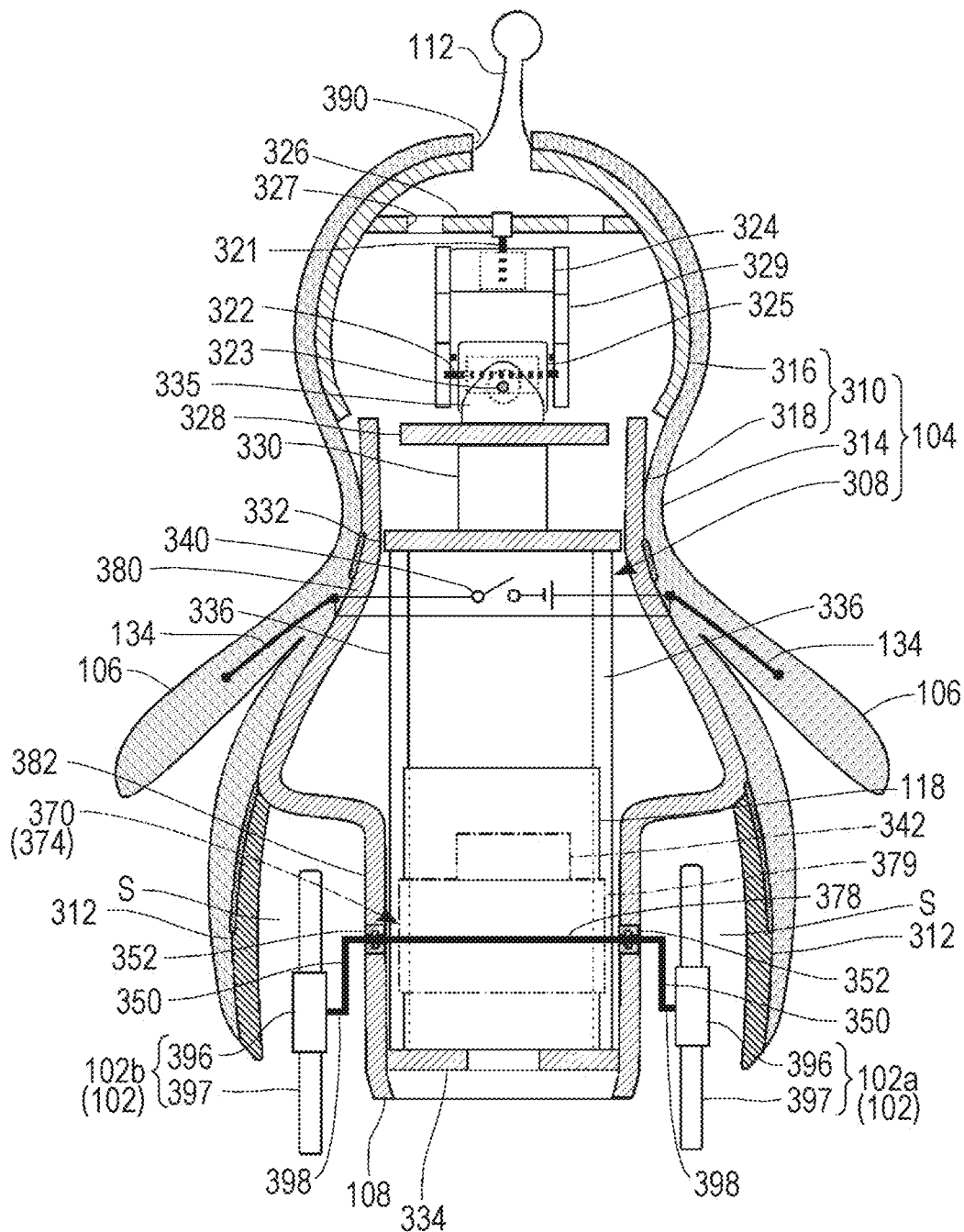
FIG. 2 is a sectional view schematically representing a structure of the robot.
Figure 3:
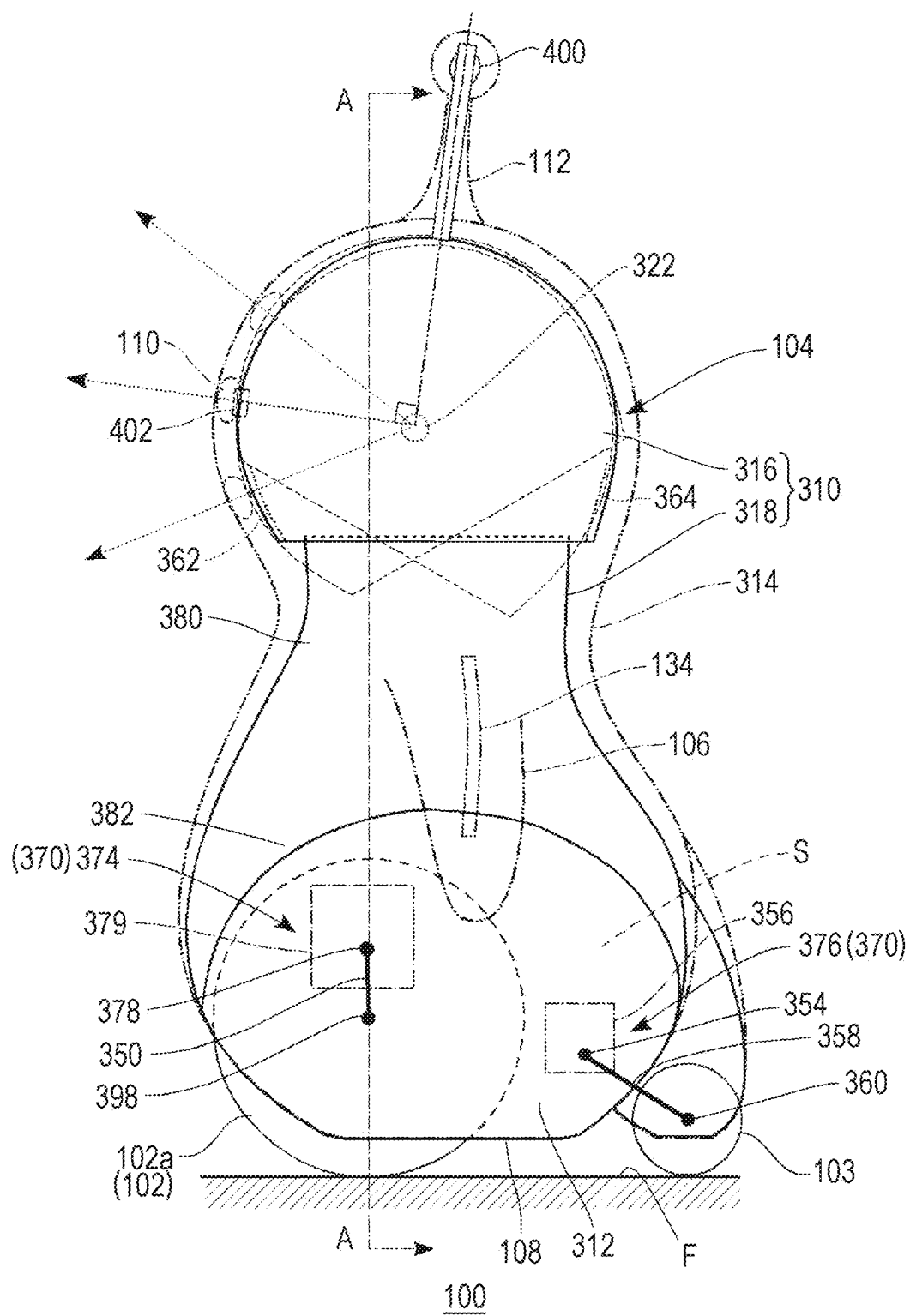
FIG. 3 is a side view representing the structure of the robot centered on a frame.

FIG. 2 is a sectional view schematically representing a structure of the robot 100. FIG. 3 is a side view representing the structure of the robot 100 centered on a frame. FIG. 2 corresponds to a section seen along an A-A arrow of FIG. 3.

As shown in FIG. 2, the body 104 of the robot 100 includes a base frame 308, a main body frame 310, a pair of wheel covers 312, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation can be carried out. A battery 118, a control circuit 342, and various kinds of actuator and the like are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 321, a pitch shaft 322, and a roll shaft 323, and actuators 324 and 325 that drive each shaft so as to rotate, are provided in the head portion frame 316. The actuator 324 includes a servomotor for driving the yaw shaft 321. The actuator 325 includes a multiple of servo motors for driving each of the pitch shaft 322 and the roll shaft 323. The yaw shaft 321 is driven for a head shaking action, the pitch shaft 322 is driven for a nodding action, a looking up action, and a looking down action, and the roll shaft 323 is driven for a head tilting action.

A plate 326 supported by the yaw shaft 321 is fixed to an upper portion of the head portion frame 316. A multiple of ventilation holes 327 for securing ventilation between upper and lower portions are formed in the plate 326.

Abase plate 328 made of metal is provided so as to support the head portion frame 316 and an internal mechanism thereof from below. The base plate 328 is linked to the upper plate 332 (the base frame 308) via a joint 330. A support base 335 is provided on the base plate 328, and the actuators 324 and 325 and a crosslink mechanism 329 (a pantagraph mechanism) are supported by the support base 335. The crosslink mechanism 329 links the actuators 325 and 326 vertically, and can cause an interval between the actuators 325 and 326 to change.

More specifically, the roll shaft 323 of the actuator 325 is linked to the support base 335 via a gear mechanism omitted from the drawings. The pitch shaft 322 of the actuator 325 is linked to a lower end portion of the crosslink mechanism 329. Meanwhile, the actuator 324 is fixed to an upper end portion of the crosslink mechanism 329. The yaw shaft 321 of the actuator 324 is linked to the plate 326. A rotary drive mechanism, omitted from the drawings, for driving the crosslink mechanism 329 so as to extend and contract is provided in the actuator 325.

According to this kind of configuration, the actuator 325 and the head portion frame 316 can be caused to rotate (roll) integrally by causing the roll shaft 323 to rotate, whereby an action of tilting the neck can be realized. Also, the crosslink mechanism 329 and the head portion frame 316 can be caused to rotate (pitch) integrally by causing the pitch shaft 322 to rotate, whereby a nodding action and the like can be realized. The plate 326 and the head portion frame 316 can be caused to rotate (yaw) integrally by causing the yaw shaft 321 to rotate, whereby an action of shaking the head can be realized. Furthermore, an action of extending and contracting the neck can be realized by causing the crosslink mechanism 329 to extend and contract.

The trunk portion frame 318 houses the base frame 308 and a wheel drive mechanism 370. As shown in FIG. 3, the wheel drive mechanism 370 includes a front wheel drive mechanism 374 and a rear wheel drive mechanism 376. An upper half portion 380 of the trunk portion frame 318 is of a smooth curved form so as to provide an outline of the body 104 with roundness. The upper half portion 380 is formed so as to become gradually narrower toward an upper portion corresponding to a neck portion. A lower half portion 382 of the trunk portion frame 318 is of a small width in order to form a housing space S of the front wheel 102 between the lower half portion 382 and the wheel cover 312. A boundary of the upper half portion 380 and the lower half portion 382 is of a stepped form.

Left and right side walls configuring the lower half portion 382 are parallel to each other, are penetrated by a pivot shaft 378, to be described hereafter, of the front wheel drive mechanism 374, and support the pivot shaft 378. The lower plate 334 is provided so as to close off a lower end aperture portion of the lower half portion 382. In other words, the base frame 308 is fixed to and supported by a lower end portion of the trunk portion frame 318.

The pair of wheel covers 312 are provided so as to cover the lower half portion 382 of the trunk portion frame 318 from left and right. The wheel cover 312 is formed of resin, and is attached so as to form a smooth outer face (curved face) continuous with the upper half portion 380 of the trunk portion frame 318. An upper end portion of the wheel cover 312 is linked along a lower end portion of the upper half portion 380. Because of this, the housing space S, which is opened downward, is formed between the side wall of the lower half portion 382 and the wheel cover 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

The front wheel drive mechanism 374 includes a rotary drive mechanism for causing the front wheel 102 to rotate and a housing operation mechanism for causing the front wheel 102 to enter and withdraw from the housing space S. That is, the front wheel drive mechanism 374 includes the pivot shaft 378 and an actuator 379. The front wheel 102 has a direct drive motor (hereafter written as a "DD motor") 396 in a central portion thereof. The DD motor 396 has an outer rotor structure, a stator is fixed to an axle 398, and a rotor is fixed coaxially to a rim 397 of the front wheel 102. The axle 398 is integrated with the pivot shaft 378 via an arm 350. A bearing 352 through which the pivot shaft 378 penetrates and which supports the pivot shaft 378 so as to be able to pivot is embedded in a lower portion side wall of the trunk portion frame 318. A sealing structure (bearing seal) for hermetically sealing the trunk portion frame 318 inside and outside is provided in the bearing 352. The front wheel 102 can be driven to reciprocate between the housing space S and an exterior by a drive of the actuator 379.

The rear wheel drive mechanism 376 includes a pivot shaft 354 and an actuator 356. Two arms 358 extend from the pivot shaft 354, and an axle 360 is provided integrally with leading ends of the arms 358. The rear wheel 103 is supported so as to be able to rotate by the axle 360. A bearing omitted from the drawings, through which the pivot shaft 354 penetrates and which supports the pivot shaft 354 so as to be able to pivot, is embedded in the lower portion side wall of the trunk portion frame 318. A shaft sealing structure is also provided in the bearing. The rear wheel 103 can be driven to reciprocate between the housing space S and the exterior by a drive of the actuator 356.

When housing the wheels, the actuators 379 and 356 are driven in one direction. At this time, the arm 350 pivots centered on the pivot shaft 378, and the front wheel 102 rises from the floor surface F. Also, the arm 358 pivots centered on the pivot shaft 354, and the rear wheel 103 rises from the floor surface F. Because of this, the body 104 descends, and the seating face 108 is grounded at the floor surface F. Because of this, a state in which the robot 100 is sitting is realized. By the actuators 379 and 356 being driven in the opposite direction, each wheel is caused to advance out of the housing space S, whereby the robot 100 can be caused to stand.

A drive mechanism for driving the arm 106 includes a wire 134 embedded in the outer skin 314, and a drive circuit 340 (energizing circuit) of the wire 134. The wire 134 is formed of a shape memory alloy line in this embodiment, contracts and hardens when heated, and relaxes and lengthens when allowed to cool. Leads drawn out from both ends of the wire 134 are connected to the drive circuit 340. When a switch of the drive circuit 340 is activated, the wire 134 (shape memory alloy line) is energized.

The wire 134 is molded or woven in so as to extend from the outer skin 314 to the arm 106. Leads are drawn from both ends of the wire 134 into the trunk portion frame 318. One wire 134 may be provided in each of a left and right of the outer skin 314, or a multiple of the wire 134 may be provided in parallel in each of the left and right of the outer skin 314. The arm 106 can be raised by energizing the wire 134, and the arm 106 can be lowered by interrupting the energization.

An angle of a line of sight (refer to dotted arrows) of the robot 100 can be adjusted by controlling an angle of rotation of the pitch shaft 322. In the embodiment, for the sake of convenience, a direction of an imaginary straight line passing through the pitch shaft 322 and the eye 110 is taken to be a direction of the line of sight. An optical axis of the high resolution camera 402 coincides with the line of sight. Also, in order to facilitate a computing process which is described below, a straight line joining the omnidirectional camera 400 and pitch shaft 322 and the line of sight are set so as to form a right angle.

Slits 362 and 364 through which the upper end portion of the trunk portion frame 318 can be inserted are provided at the front and back of the head portion frame 316. Because of this, a range of movement (range of rotation) of the head portion frame 316, which is centered on the pitch shaft 322, can be increased. In the embodiment, the range of movement is taken to be 90 degrees, which is 45 degrees each up and down from a state wherein the line of sight is horizontal. That is, a limit value of an angle at which the line of sight of the robot 100 is oriented upward (an angle of looking up) is taken to be 45 degrees, and a limit value of an angle at which the line of sight is oriented downward (an angle of looking down) is also taken to be 45 degrees.

Figure 4:
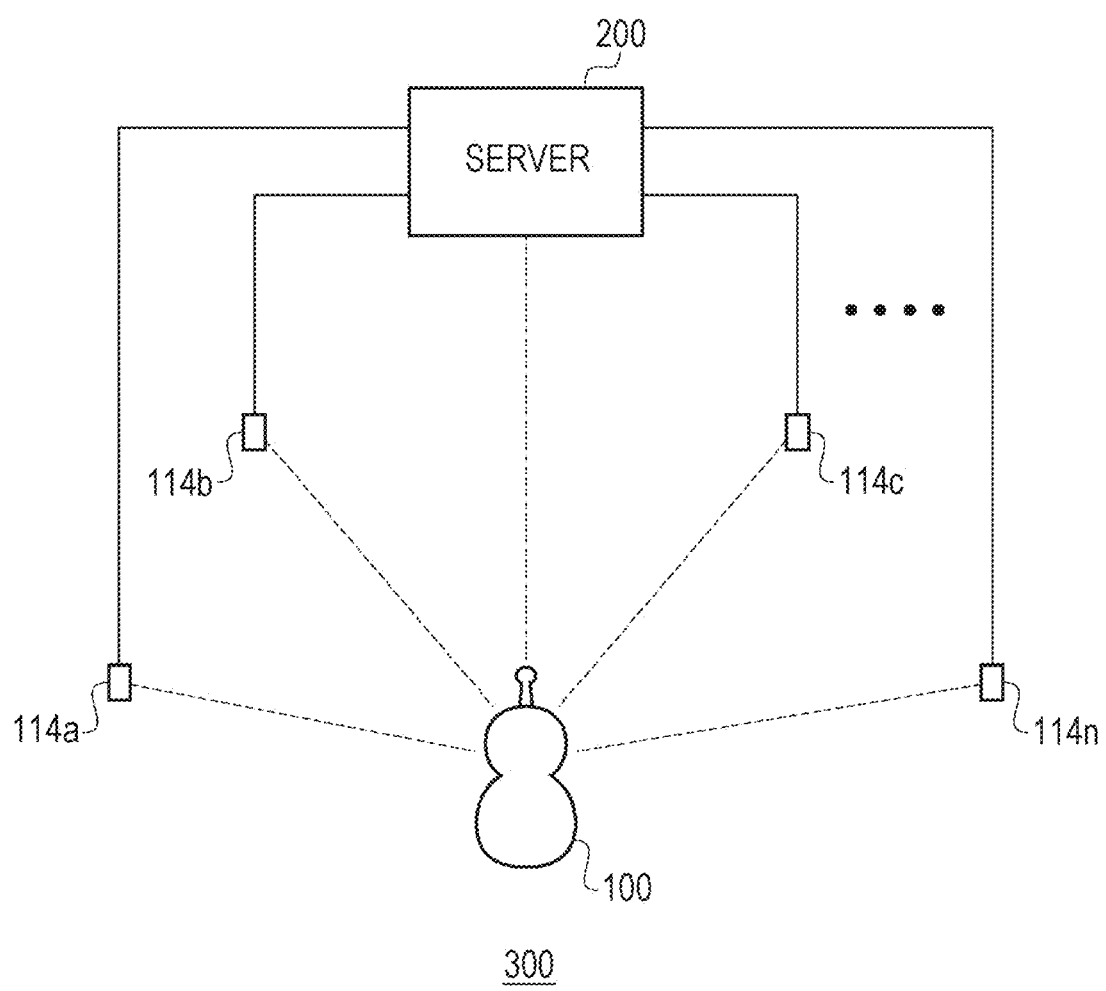
FIG. 4 is a configuration diagram of a robot system.

FIG. 4 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114. The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100. Of course, a method whereby the robot 100 regularly transmits its own positional coordinates to the server 200 may also be adopted.

Figure 5:
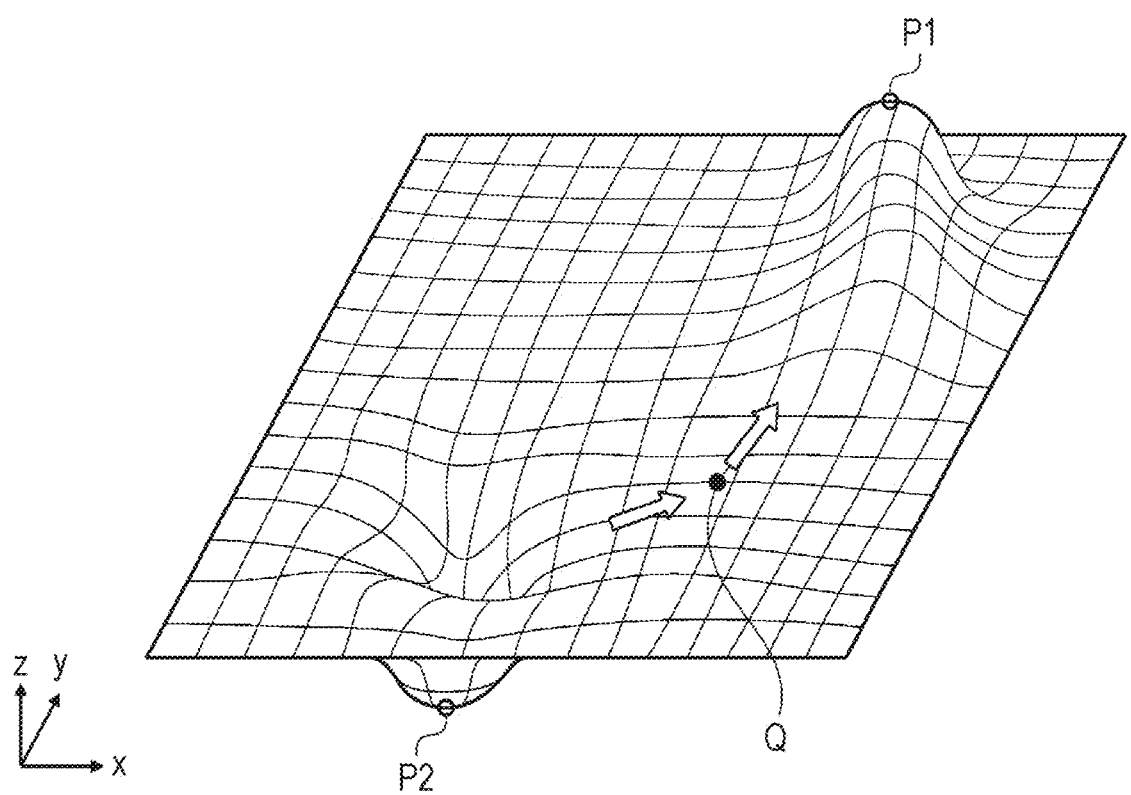
FIG. 5 is a schematic view of an emotion map.

FIG. 5 is a schematic view of an emotion map 116.

The emotion map 116 is a data table stored in the server 200. The robot 100 selects an action in accordance with the emotion map 116. The emotion map 116 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past. A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like. A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies position coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the wheel 102, thereby identifying the current position, or may identify the current position based on an image obtained from the camera. When the emotion map 116 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek ease of mind, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter may be reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 6:
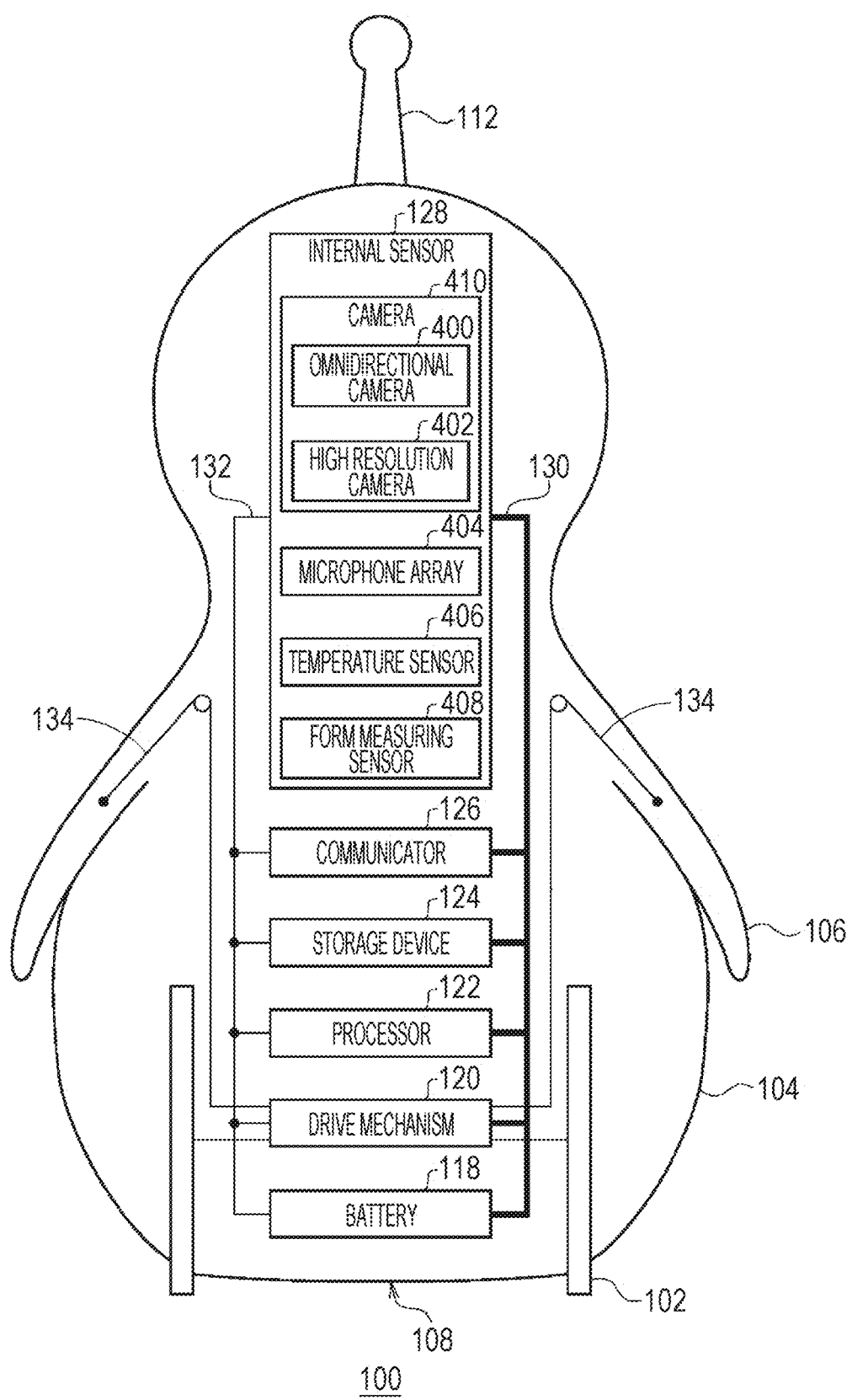
FIG. 6 is a hardware configuration diagram of the robot.

FIG. 6 is a hardware configuration diagram of the robot 100.

The robot 100 includes an internal sensor 128, a communicator 126, a storage device 124, a processor 122, a drive mechanism 120, and the battery 118. The drive mechanism 120 includes the wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a rechargeable battery such as a lithium ion battery, and is a power source of the robot 100.

The internal sensor 128 is a collection of various kinds of sensor incorporated in the robot 100. Specifically, in addition to a camera 410 (the omnidirectional camera 400 and the high resolution camera 402), a microphone array 404, a temperature sensor 406, and a form measuring sensor 408, the internal sensor 128 is an infrared sensor, a touch sensor, an acceleration sensor, a smell sensor, and the like. The smell sensor is a commonly known sensor that applies a principle such that electrical resistance changes in accordance with adsorption of molecules that form a source of a smell. The smell sensor categorizes various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing the computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection.

The drive mechanism 120 mainly controls the wheels (the front wheels 102), the head portion (the head portion frame 316), and the trunk portion (the arm 106). The drive mechanism 120 causes a direction of movement and a movement speed of the robot 100 to change by causing the rotational speed and the direction of rotation of each of the two front wheels 102 to change. Also, the drive mechanism 120 can also raise and lower the wheels (the front wheels 102 and the rear wheel 103). When the wheels rise, the wheels are completely stored in the body 104, and the robot 100 comes into contact with a floor surface via the seating face 108, taking on the sitting state.

The arm 106 can be lifted up by the drive mechanism 120 pulling the arm 106 via the wire 134. A gesture like an arm waving can also be performed by the arm 106 being caused to oscillate. A more complex gesture can also be represented by a large number of the wire 134 being utilized.

Figure 7:
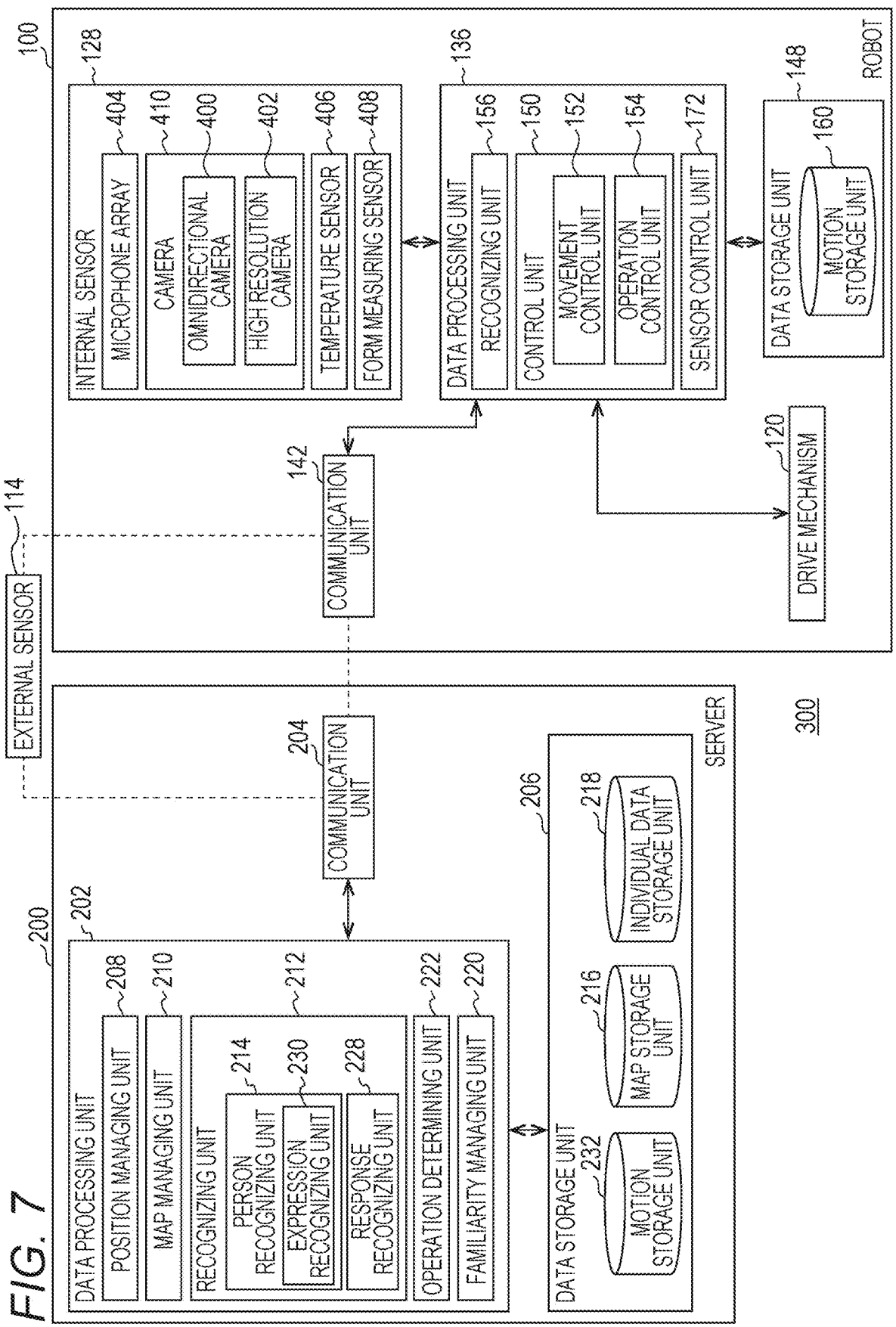
FIG. 7 is a functional block diagram of the robot system.

FIG. 7 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.
Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218. The robot 100 has a multiple of operation patterns (motions). Various motions, such as waving a hand, approaching an owner while meandering, and staring at an owner with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100.

Many of the motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time when changing from a preceding unit motion to a subsequent unit motion is called an "interval". It is sufficient that an interval is defined in accordance with time needed for a unit motion change or details of a motion. A length of an interval can be regulated. Hereafter, settings relating to controlling behavior of the robot 100, such as which motion is chosen and when, and regulating output of each actuator when a motion is realized, will collectively be called "behavioral characteristics". Behavioral characteristics of the robot 100 are defined by a motion selection algorithm, a motion selection probability, a motion file, and the like.

The map storage unit 216 stores a multiple of action maps. The individual data storage unit 218 stores information on a user, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad. The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process load is large, but there is an advantage in that even a user who does not have a mobile device can be identified. One of the two methods may be employed alone, or user identification may be carried out using the two methods together in a complementary way. In this embodiment, users are clustered based on physical characteristics and behavioral characteristics, and a user is identified using deep learning (a multilayer neural network).

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation determining unit 222, and a familiarity managing unit 220. The position managing unit 208 identifies the positional coordinates of the robot 100 using the method described using FIG. 4. The position managing unit 208 may also track positional coordinates of a user in real time.

The map managing unit 210 changes the parameter of each coordinate on the multiple of action maps using the method described in connection with FIG. 5. The map managing unit 210 manages a temperature map, which is one kind of action map.

The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1. When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user. In addition to a person, the person recognizing unit 214 also, for example, extracts characteristics of a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response. Pleasant and unpleasant actions are distinguished depending on whether a responsive action of a user is pleasing or unpleasant for a living being. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation determining unit 222 determines a motion of the robot 100 in cooperation with a control unit 150 of the robot 100. The operation determining unit 222 compiles a movement target point of the robot 100, and a movement route for the movement target point, based on an action map selection by the map managing unit 210. The operation determining unit 222 compiles a multiple of movement routes, and having done so, may select any of the movement routes.

The operation determining unit 222 selects a motion of the robot 100 from a multiple of motions of the motion storage unit 232. A selection probability is correlated to each motion for each situation. For example, a selection method such that a motion A is executed with a 20% probability when a pleasant action is performed by an owner, and a motion B is executed with a 5% probability when a temperature reaches 30 degrees or higher, is defined. A movement target point and a movement route are determined by an action map, and a motion is selected in accordance with various kinds of map, to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, the familiarity managing unit 220 reduces familiarity. Also, familiarity of an owner who has not been visually recognized for a long period gradually decreases.

Robot 100

The robot 100 includes the internal sensor 128, a communication unit 142, a data processing unit 136, a data storage unit 148, and the drive mechanism 120. The internal sensor 128 is a collection of various kinds of sensor. The internal sensor 128 includes the microphone array 404, the camera 410, the temperature sensor 406, and the form measuring sensor 408.

The microphone array 404, being a unit wherein a multiple of microphones are linked together, is a voice sensor that detects sound. It is sufficient that the microphone array 404 is a device that detects sound, and can detect a direction of a source of the sound. The microphone array 404 is incorporated in the head portion frame 316. As distances between a sound source and each microphone do not coincide, variation occurs in sound collection timing. Because of this, a position of the sound source can be identified from a magnitude and a phase of sound at each microphone. The robot 100 can detect a position of a sound source, and in particular a direction of the sound source, using the microphone array 404.

The camera 410 is a device that films the exterior. The camera 410 includes the omnidirectional camera 400 and the high resolution camera 402. The temperature sensor 406 detects a temperature distribution of an external environment, and converts the temperature distribution into an image. The form measuring sensor 408 is an infrared depth sensor that reads a depth, and by extension an uneven form, of a target object by emitting near-infrared rays from a projector, and detecting reflected light of the near-infrared rays using a near-infrared camera.

The communication unit 142 corresponds to the communicator 126 (refer to FIG. 6), and manages a process of communicating with the external sensor 114 and the server 200. The data storage unit 148 stores various kinds of data. The data storage unit 148 corresponds to the storage device 124 (refer to FIG. 6). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded into the motion storage unit 160 from the motion storage unit 232 of the server 200. A motion is identified by motion ID. An operation timing, an operating time, an operating direction, and the like, of the various kinds of actuator (the drive mechanism 120) are defined chronologically in a motion file in order to perform various motions such as sitting by housing the front wheel 102, raising the arm 106, causing the robot 100 to carry out a rotating action by causing the two front wheels 102 to rotate in reverse or by causing only one front wheel 102 to rotate, shaking by causing the front wheel 102 to rotate in a state in which the front wheel 102 is housed, or stopping once and looking back when moving away from a user.

The data processing unit 136 includes a recognizing unit 156, the control unit 150, and a sensor control unit 172. The control unit 150 includes a movement control unit 152 and an operation control unit 154. The movement control unit 152 determines a direction of movement of the robot 100 together with the operation determining unit 222 of the server 200. Movement based on an action map may be determined by the server 200, and an immediate movement such as avoiding an obstacle may be determined by the robot 100. The drive mechanism 120 causes the robot 100 to head toward a movement target point by driving the front wheel 102 in accordance with an instruction from the operation control unit 152.

The operation control unit 154 determines a motion of the robot 100 in cooperation with the operation determining unit 222 of the server 200. One portion of motions may be determined by the server 200, and other motions may be determined by the robot 100. Also, a configuration may be such that the robot 100 determines a motion, but the server 200 determines a motion when a processing load of the robot 100 is high. A motion that forms a base may be determined by the server 200, and an additional motion may be determined by the robot 100. It is sufficient that a way in which a motion determining process is shared between the server 200 and the robot 100 is designed in accordance with specifications of the robot system 300. The operation control unit 154 instructs the drive mechanism 120 to execute a selected motion. The drive mechanism 120 controls each actuator in accordance with the motion file.

The action control unit 154 can also execute a motion of holding up both arms 106 as a gesture asking for "a hug" when a user with a high degree of familiarity is nearby, and can also perform a motion of no longer wanting to be hugged by causing the left and right front wheels 102 to repeatedly alternate between rotating in reverse and stopping while remaining housed when bored of the "hug". The drive mechanism 120 causes the robot 100 to perform various motions by driving the front wheels 102, the arm 106, and the neck (the head portion frame 316) in accordance with an instruction from the operation control unit 154.

The sensor control unit 172 controls the internal sensor 128. Specifically, the sensor control unit 172 controls a direction of measurement by the high resolution camera 402, the temperature sensor 406, and the form measuring sensor 408. The direction of measurement by the high resolution camera 402, the temperature sensor 406, and the form measuring sensor 408 mounted in the head portion of the robot 100 changes in accordance with the orientation of the head portion frame 316. The sensor control unit 172 controls a direction of filming by the high resolution camera 402 (that is, the sensor control unit 172 controls movement of the head portion in accordance with the direction of filming). The sensor control unit 172 and the camera 410 function as a "filming unit".

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit). The recognizing unit 156 regularly acquires detection information from the camera 410, the temperature sensor 406, and the form measuring sensor 408, and detects a moving object such as a person or a pet. These items of information are transmitted to the server 200, and the person recognizing unit 214 of the server 200 extracts the physical characteristics of the moving object. Also, the recognizing unit 156 also detects a smell of a user and a voice of a user. Smell and sound (voice) are classified into multiple kinds using an already known method.

When a strong force is applied to the robot 100, the recognizing unit 156 recognizes this using the incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of facing the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, an incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

It is assumed that the robot 100 newly recognizes a moving object (user) in a state in which this kind of cluster analysis using characteristic extraction is completed. At this time, the person recognizing unit 214 of the server 200 extracts characteristics from sensing information of an image or the like obtained from the robot 100, and determines which cluster a moving object near the robot 100 corresponds to using deep learning (a multilayer neural network).

Formation of a cluster by characteristic extraction (cluster analysis) and application to a cluster accompanying characteristic extraction (deep learning) may be executed concurrently. Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A Cluster with Extremely High Familiarity

The robot 100 strongly expresses a feeling of affection by approaching a user (hereafter called "an approaching action"), and by performing an affectionate gesture defined in advance as a gesture indicating goodwill toward a person.

(2) A Cluster with Comparatively High Familiarity

The robot 100 carries out only an approaching action.

(3) A Cluster with Comparatively Low Familiarity

The robot 100 does not carry out any special action.

(4) A Cluster with Particularly Low Familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Next, a control for the robot 100 to maintain a natural distance from a user will be described.

The robot 100 of the embodiment appropriately maintains a distance from the user in accordance with the attributes and familiarity (preference) of a user who enters a field of view, thereby emulating a natural action in an animal-like way. The recognizing unit 156 also functions as a "preference determining unit". Also, by performing a gesture of looking up at the face of the user at a natural angle in accordance with the distance, the user is caused to feel affection. Hereafter, details thereof will be described.

Figure 8:
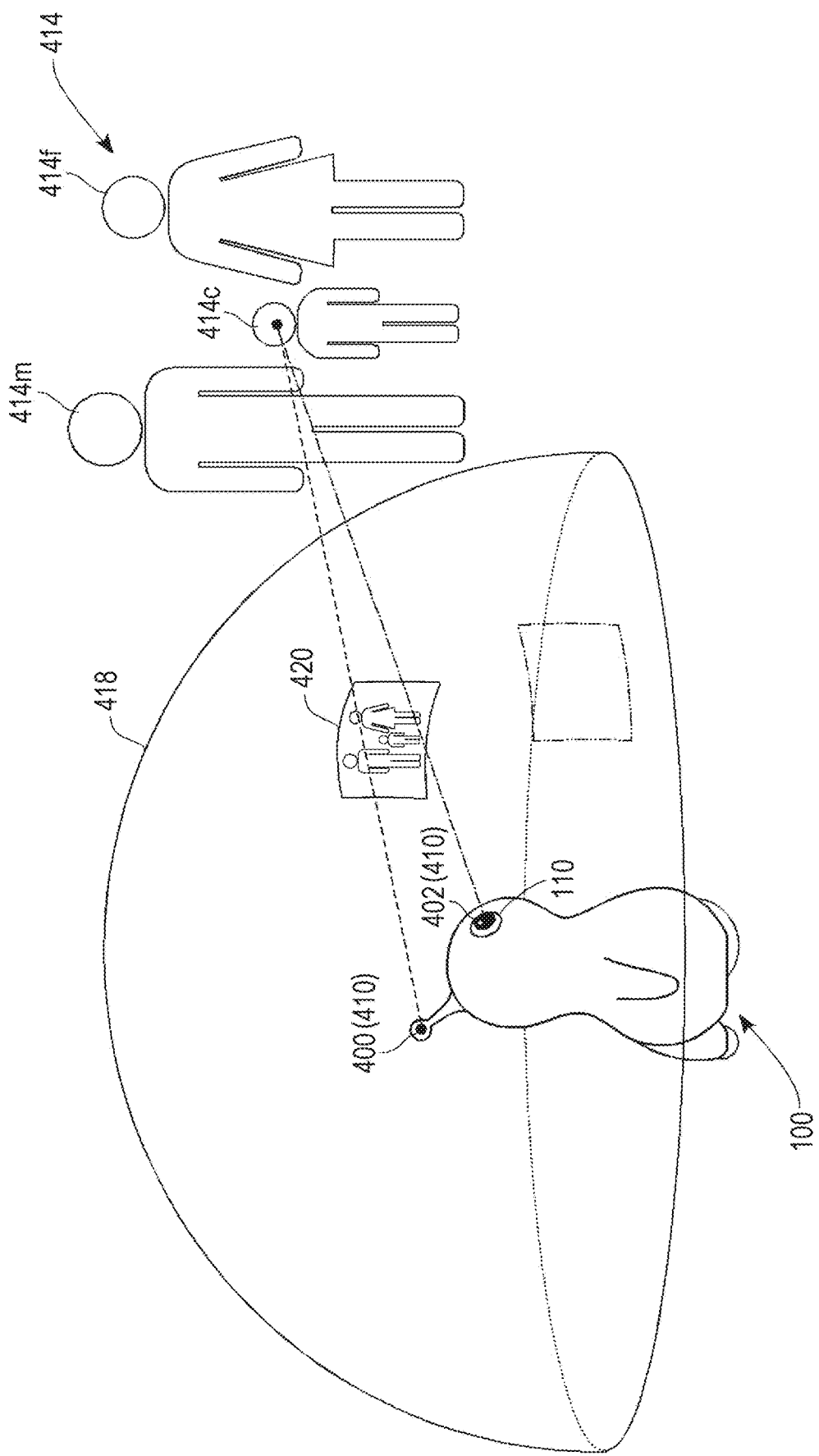
FIG. 8 is a schematic view representing a method of controlling distance from a user.

FIG. 8 is a schematic view representing a method of controlling distance from a user.

The robot 100 extracts a user (target object) from subjects of the camera 410 and analyzes an image thereof, and when there is corresponding user information, refers to the user information, and moves so that a distance from the user is appropriate. The height of the robot 100 in the embodiment is assumed to be in the region of 50 centimeters. When the robot 100 of this height visually recognizes a user's face, the robot 100 necessarily assumes a state of looking up by inclining the head portion. In order to increase the angle of looking up and visually recognize a user's face, the robot 100 needs to approach the user, and when reducing the angle of looking up, the robot 100 needs to move away from the user. By controlling so that the angle of looking up is constant, and controlling an advancing and withdrawing action of the robot 100 so as to maintain the state of visual recognition of the user's face at the time, the robot 100 can be caused to follow the user while maintaining a natural distance from the user. That is, a natural distance can be maintained without measuring a definite distance between the robot 100 and the user.

In FIG. 8, an omnidirectional filming range 418 is a filming range of the omnidirectional camera 400. The omnidirectional camera 400 can film approximately the whole range of the hemisphere above the robot 100 at one time. The recognizing unit 156 analyzes an image (filmed image) of a filming region 420, which is a predetermined range of the omnidirectional filming range 418 that includes a direction of a target object 414. In the embodiment, a living being among the subjects that forms a target of interaction or physical contact, like a person (user) or an animal (pet), is called a "target object", but a configuration may be such that only a human in particular is a target object.

The recognizing unit 156 carries out an image analysis to determine whether a subject having predetermined characteristics exists in the filming region 420. In the embodiment, the recognizing unit 156 of the robot 100 executes a process of recognizing an image of the target object 414 from the filming region 420. In a modified example, the recognizing unit 212 of the server 200 may execute the image recognition, or both the recognizing unit 212 of the server 200 and the recognizing unit 156 of the robot 100 may execute the image recognition.

When identifying the target object 414 from the subjects, the recognizing unit 156 measures the peripheral temperature distribution of a subject using the temperature sensor 406, and determines whether or not the subject is a heat generating object, particularly an object generating heat in the region of 30 to 40 degrees Celsius. The recognizing unit 156 also functions as a "temperature determining unit". As a warm-blooded animal such as a human or a pet is a heat generating object, audio equipment, a television, a wall, a mirror, and the like can be eliminated from candidates as the target object 414 by the temperature measurement.

Furthermore, the recognizing unit 156 measures a three-dimensional form of a subject using the form measuring sensor 408, and determines whether or not the subject is an object having a predetermined form. For example, the recognizing unit 156 determines whether or not the subject has an uneven form. When the subject does not have an uneven form, it is thought that the subject is a flat body such as a television, a wall, or a mirror, because of which these can be eliminated from candidates as the target object 414. More preferably, it is desirable that characteristics of the three-dimensional form of the subject are detected by the form measuring sensor 408. When characteristics of the form of a person's face or an animal's face (the position of the nose, the form of the mouth, and the like) can be recognized, an inanimate object such as audio equipment or a television is more reliably easy to eliminate from candidates as the target object 414. Characteristic information of faces of each cluster is also stored in the individual data storage unit 218 by the form measuring sensor 408. This means that, more preferably, who the target object 414 is may be identified by the form measuring sensor 408.

When a candidate as the target object 414 (called a "target object candidate") is identified by the temperature sensor 406 and the form measuring sensor 408 in this way, the target object candidate is filmed using the high resolution camera 402. At this time, an angle of view is adjusted so that the whole of the target object candidate is included in a center of a screen. As already mentioned, the optical axis of the high resolution camera 402 coincides with the line of sight. Because of this, the target object candidate exists in the direction of the line of sight of the robot 100. The recognizing unit 156 identifies the target object candidate as being the target object 414 based on the image of the high resolution camera 402.

For example, a target object candidate having physical and behavioral characteristics peculiar to a living being, such as having portions corresponding to two eyes and one mouth, being flesh color, moving, and wearing clothing, is recognized as the target object 414. Further, publicly known facial recognition technology is used in order to identify the face of the target object 414. The facial recognition is such that, for example, a facial region is identified by detecting an edge portion of the face from the image of the target object 414, and a pattern of a preset characteristic amount (a disposition of an eye, a nose, and a mouth, or the like) is compared with the image of the facial region. When a resemblance obtained from the comparison is equal to or greater than a reference value, it can be determined that the image is a face. When there are a multiple of the target object 414, a multiple of faces are identified.

After identifying the target object 414 in this way, the recognizing unit 156 furthermore identifies a height of the target object 414 and a size of the face. Specifically, the recognizing unit 156 extracts a characteristic point of the target object 414 from the imaging screen, and identifies a height of the characteristic point as a "target object height". In the embodiment, the recognizing unit 156 extracts a nose protruding forward from a center of the face as the characteristic point, and identifies the height of the target object 414. Also, the recognizing unit 156 extracts an outline of the face, and identifies a vertical direction length thereof as a "face size". The advancing and withdrawing action of the robot 100 is controlled so that the size of the region recognized as the face (also called the "facial region"), that is, an area of the facial region, is a predetermined region on the imaging screen. When the area of the facial region is increased, a distance from the target object 414 decreases, and when the area of the facial region is reduced, a distance from the target object 414 increases.

When there are a multiple of the target object 414, the target object 414 that is to be a target of distance adjustment is identified based on information on the heights and face sizes of the multiple of the target object 414. When there is a single target object 414, this is taken to be the target of adjustment. Further, the angle of looking up is set in accordance with the attributes and familiarity of the target object 414 that is the target of adjustment, and the distance from the target object 414 (also called a "face-to-face distance") is controlled so that the face of the target object 414 comes on the line of sight at the angle of looking up when facing the target object 414. For example, when approaching a child in a situation wherein parents and the child are gathered together, measuring an accurate distance from the child using an ultrasonic sensor is difficult. However, by controlling so that the area of the child's facial region fits within a certain range after visually recognizing the child's face and setting the angle of looking up at a constant angle, the distance can be adjusted in accordance with the child.

Figure 9:
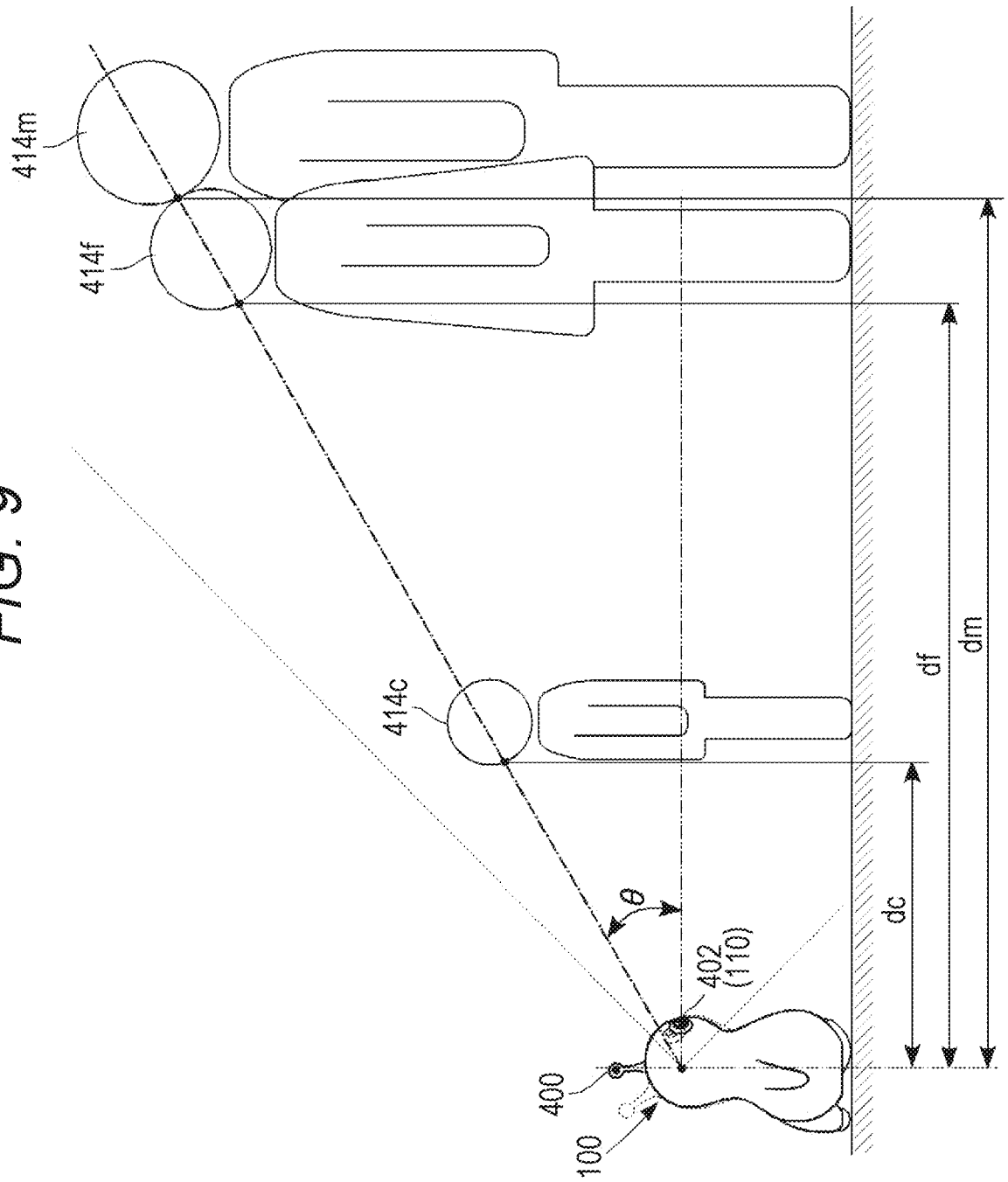
FIG. 9 is a drawing showing an example of a method of setting an angle of looking up.

FIG. 9 is a drawing showing an example of a method of setting the angle of looking up.

A vertical range of the line of sight of the robot 100 (that is, a range in which the head portion can move) is assumed to be −45 degrees to +45 degrees (refer to dotted lines) with respect to a horizontal direction (refer to a two-dot chain line). A sense of inserting a subject into a comfortable viewing angle within the range of movement of the head portion, as a living being does, is recreated. Because of this, an angle of looking up θ (an angle of upward orientation with respect to the horizontal direction) of the robot 100 is adjusted within a range of 0 to 45 degrees. In order to cause the gesture of looking up to appear natural, 30 degrees (refer to a dashed-dotted line) is set as a reference value.

When familiarities recognized by the robot 100 are the same, a face-to-face distance d differs in accordance with attributes such as whether the target object 414 is an adult or a child, or male or female. That is, a distance from a child 414c is shorter than that from adults 414m and 414f. Also, in the case of an adult, the distance differs in accordance with the height of the adult. In the example shown in the drawing, a distance df from the female 414f is shorter than a distance dm from the adult male 414m, and a distance dc from the child 414c is shorter still. In this way, an animal's instinctive adjustment of distance, whereby the animal moves away from a large object and approaches a small object, can be realized by a uniform process of carrying out advancing and withdrawing control so that the area of the facial region fits within a predetermined range in a state wherein the angle of looking up is constant.

Assuming that the three people are standing side-by-side (refer to FIG. 8), the robot 100 gives priority to the distance dc from the short child 414c. That is, the movement control unit 152 causes the robot 100 to move so that the distance from the child 414c is the distance dc. At this time, in order for the gesture of the robot 100 to appear natural, control is carried out so that drive of the head portion is started when the robot 100 has approached to within a predetermined distance (for example, within 5 m) of the child 414c, and the angle of looking up θ gradually approaches the set value.

A speed at which the robot 100 approaches the target object 414 should be gentle. Because of this, the target object 414 can touch the robot 100 even though the face-to-face distance is set. That is, physical contact with the robot 100 in accordance with an intention of a user is ensured.

Figure 10A:
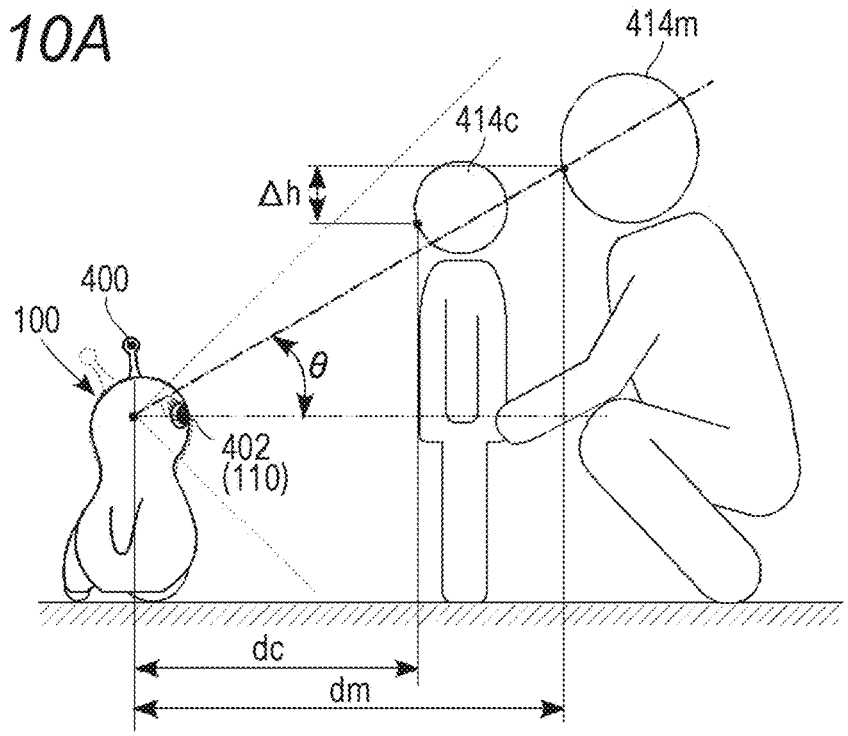
FIG. 10A and FIG. 10B are drawings showing other examples of methods of setting the angle of looking up.
Figure 10B:
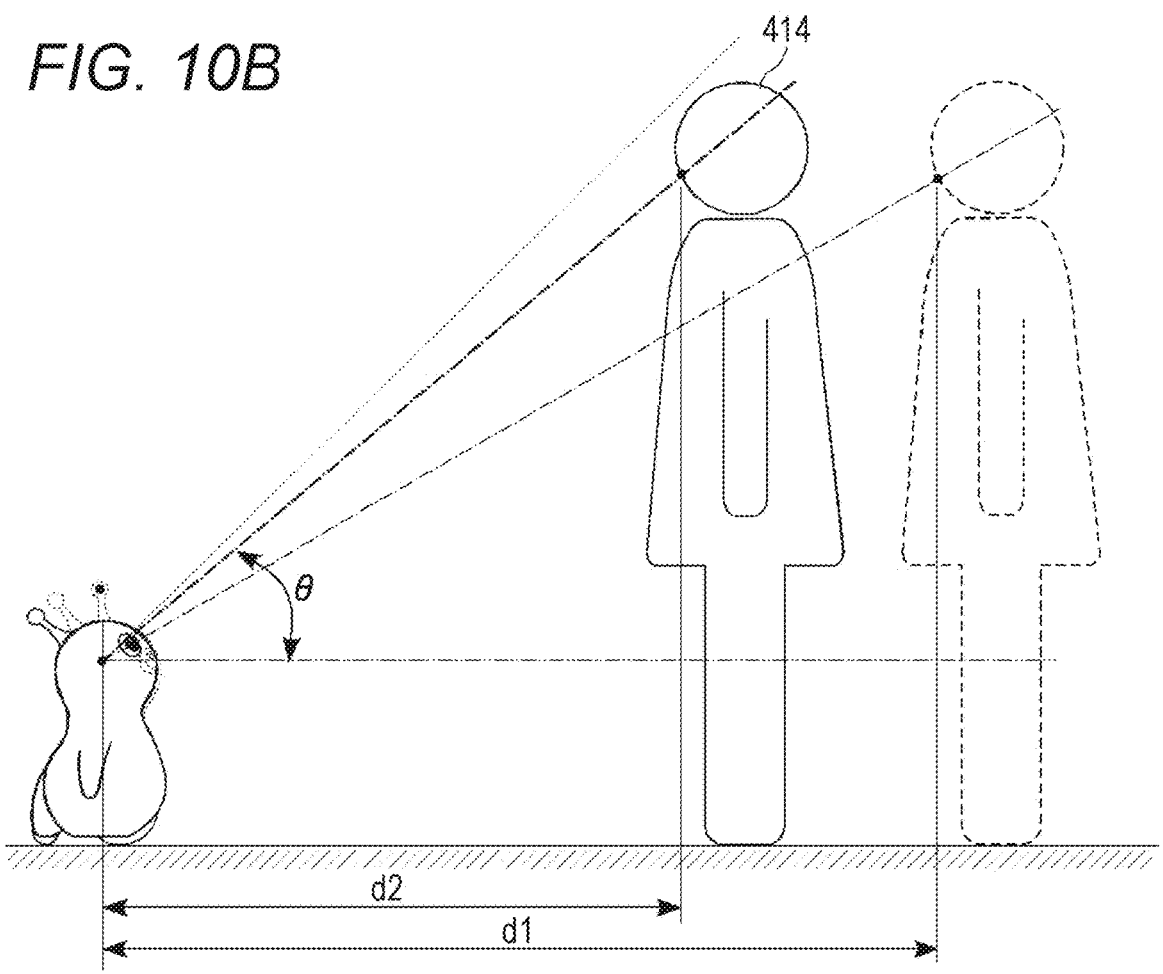

FIG. 10A and FIG. 10B are drawings showing other examples of methods of setting the angle of looking up. FIG. 10A shows a case in which a multiple of target objects exist, and FIG. 10B shows a change in the angle of looking up in accordance with familiarity.

In a case wherein, for example, the father 414m crouches in a vicinity of the child 414c and speaks to the robot 100, as shown in FIG. 10A, it is thought that responding to the father 414m, who is expressing familiarity, is natural, and that empathy will be obtained. Therefore, when a multiple of the target object 414 exist in this way, the target object 414 with the larger face is adopted as a reference for distance control when a difference Δh between the heights of two identified target objects 414 is equal to or less than a reference value (for example, a height on the screen corresponding to 20 cm or less). In the example shown in the drawing, the movement control unit 152 causes the robot 100 to face the father 414m, and causes the robot 100 to move to a position wherein the angle of looking up θ is at the set value (for example, 30 degrees). The operation control unit 154 drives the head portion so that the angle of looking up θ gradually approaches the set value in the process of moving. The "height difference Δh" and the "reference value" may be set as pixel numbers in image processing.

The angle of looking up θ can vary in accordance with the familiarity of the target object 414. That is, when the familiarity of the target object 414 becomes higher than before, the setting is changed so that the angle of looking up θ becomes an angle (for example, 40 degrees; refer to a thick dashed-dotted line) greater than the previous angle (for example, 30 degrees; refer to a thin dashed-dotted line), as shown in FIG. 10B. As a result of this, the distance between the robot 100 and the target object 414 decreases from d1 to d2. Because of this, the robot 100 having more goodwill than before toward the target object 414 can be expressed, in the same way that a pet becomes accustomed to an owner and reduces a distance from the owner.

Figures 11, 12:
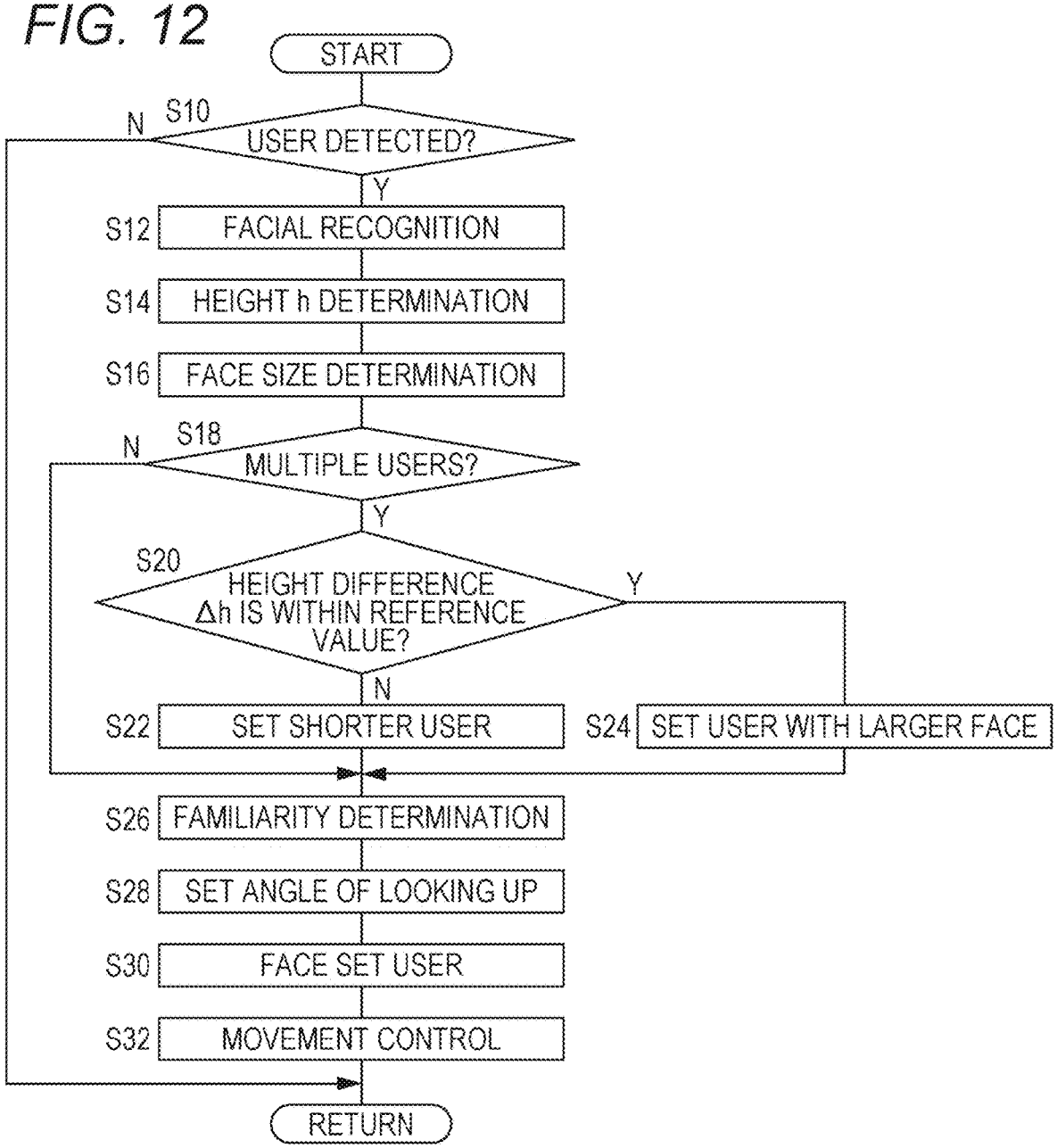
FIG. 11 is a drawing representing a setting table referred to when determining the angle of looking up.
FIG. 12 is a flowchart showing an example of an operation control of the robot.

FIG. 11 is a drawing representing a setting table referred to when determining the angle of looking up.

The setting table is a data table in which a correspondence between the angle of looking up and familiarity is defined. In the example shown in the drawing, a standard familiarity (called "standard familiarity") is 21 or greater, 40 or less, and the angle of looking up θ corresponding thereto is 30 degrees. When the familiarity of the target object 414 becomes higher than the standard familiarity, the angle of looking up θ becomes greater than 30 degrees. At this time, the robot 100 approaches nearer to the target object 414 than before, and performs a gesture of watching closely. Because of this, the robot 100 having more goodwill than before toward the target object 414 can be expressed.

Conversely, when the familiarity of the target object 414 becomes lower than the standard familiarity, the angle of looking up θ becomes smaller than 30 degrees. At this time, the robot 100 moves farther away from the target object 414 than before, and performs a gesture of watching closely. Because of this, dissatisfaction or wariness with respect to a lack of affection from the target object 414 can be expressed. By changing distance in accordance with familiarity in this way, action selection of the robot 100 can be a human-like or animal-like action selection.

FIG. 12 is a flowchart showing an example of an operation control of the robot 100.

A process in the drawing is repeatedly executed in a predetermined control cycle. Hereafter, a description will be given with a case wherein the target object 414 is a user as an example.

The internal sensor 128 regularly films the periphery of the robot 100, and measures the peripheral temperature. When a subject is captured by the omnidirectional camera 400, the recognizing unit 156 determines whether or not the subject is a user based on information detected by the temperature sensor 406 and the form measuring sensor 408. When the subject is a user (Y in S10), the recognizing unit 156 recognizes the face of the user using the high resolution camera 402, and tracks the face (S12).

The recognizing unit 156, based on an image filmed by the high resolution camera 402, determines a height h of the user (S14), and determines the size of the user's face (S16). When a multiple of users exist (Y in S18), the shorter user is set as a target of distance adjustment (S22) when the height difference Δh of the multiple of users is not equal to or smaller than a reference value (N in S20). Meanwhile, when the height difference Δh is equal to or smaller than the reference value (Y in S20), the user with the larger face is set (S24). When there is one user (N in S18), the processes of S20 to S24 are skipped. A user set at this time is also called a "set user".

The recognizing unit 156 acquires information on the set user, and determines the familiarity of the set user (S26). When there is no information on the set user, the recognizing unit 156 provisionally determines the familiarity to be the standard familiarity. Further, the recognizing unit 156 refers to the setting table (FIG. 11) using the familiarity, and sets the angle of looking up θ (S28).

The movement control unit 152 causes the robot 100 to face the set user (S30), and causes the robot 100 to move in the direction of the set user (S32). At this time, the operation control unit 154 drives the head portion so that the angle of looking up θ gradually approaches the set value in the process of moving. When the user approaches nearer to the robot 100 than the distance corresponding to the angle of looking up θ, the movement control unit 152 causes the robot 100 to move away from the set user to the distance corresponding to the angle of looking up θ. When no user is detected (N in S10), the processes of S12 to S32 are skipped, and the process is ended once.

Heretofore, the robot 100 and the robot system 300 including the robot 100 have been described based on the embodiment. According to the embodiment, the robot 100 controls the distance from a user in accordance with the height and face size of the user. The distance from a large person is increased, and the distance from a small person is reduced. Owing to this kind of operation, a natural distance from the robot 100, as seen from a user, can be maintained. As this distance depends on the setting of the angle of looking up, the robot 100 directs a look toward a user at a natural angle. Because of this, the user can also be caused to feel a sense of pleasantness.

Control is carried out so that the angle of looking up is constant (a set value) in this way, because of which, when a user crouches and seeks physical contact with the robot 100, the robot 100 carries out an action of approaching the user. Because of this, the robot 100 can straightforwardly respond to a user's desire for the robot 100 to come close.

Also, the angle of looking up changes in accordance with the magnitude of the familiarity. When the familiarity increases, the angle of looking up changes in an upward direction. Because of this, the robot 100 can also perform a gesture of seeking physical contact with a user. Conversely, when the familiarity decreases, the angle of looking up changes in a downward direction. Because of this, the robot 100 exhibits a sense of wariness toward a user, or can also perform a gesture of being shy, or the like.

For example, when envisaging a relationship between an animal such as a pet and a person, it is natural for the person to maintain a certain degree of distance from the animal when the person is standing. It is when there is considerable goodwill that the animal approaches the person and plays around. According to the embodiment, this kind of animal-like natural action (instinctive and simple action) can be emulated by controlling the angle of looking up of the robot 100 in accordance with familiarity.

The invention not being limited to the heretofore described embodiment and modified example, components can be modified and embodied without departing from the scope of the invention. Various inventions may be formed by appropriately combining a plurality of components disclosed in the heretofore described embodiment and modified example. Also, some components may be omitted from the total of components shown in the heretofore described embodiment and modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

In the heretofore described embodiment, a configuration including the omnidirectional camera 400 and the high resolution camera 402 is shown as an example of the camera 410. In a modified example, the high resolution camera 402 may be omitted in order to reduce cost and the like. That is, the imaging screen including the target object 414 may be cut out as one portion of the omnidirectional filming range 418 of the omnidirectional camera 400. Note that in order to maintain facial recognition of the target object 414 (user) at a high accuracy, it is preferable that the high resolution camera 402 is also used, as in the heretofore described embodiment. In the heretofore described embodiment, the optical axis of the high resolution camera 402 and the line of sight of the robot 100 are caused to coincide, because of which adjustment of the angle of looking up is also adjustment in the optical axis direction, and control is simple.

Alternatively, the omnidirectional camera 400 may be omitted, and the target object 414 identified using the high resolution camera 402. Note that in this case, it is necessary that the head portion is constantly driven to film the periphery. Also, tracking is started the instant the target object 414 enters the filming field of the high resolution camera 402, and the action of the robot 100 is liable to become awkward. Regarding this point, the omnidirectional camera 400 is such that detection of the target object 414 is easy, even without moving the camera itself. Because of this, it is preferable that the omnidirectional camera 400 and the high resolution camera 402 are used together, as in the heretofore described embodiment.

In the embodiment, the target object 414 is sensed using the camera 410, the temperature sensor 406, and the form measuring sensor 408, and a recognition process is executed by the recognizing unit 156 of the robot 100. In a modified example, one portion or the whole of the recognition process may be executed by the recognizing unit 212 of the server 200. Also, one portion of the functions of the internal sensor 128 may be mounted in the external sensor 114. For example, an implementation can be performed such that the camera 410 is mounted in the external sensor 114, image information from the external sensor 114 is analyzed by the server 200, and the robot 100 identifies the position of the target object 414 based on a result of the analysis.

In the heretofore described embodiment, the omnidirectional camera 400 is provided in the horn 112, and is of a configuration that moves integrally with the head portion of the robot 100. In a modified example, the omnidirectional camera 400 may be provided in a region (a position not affected by movement of the line of sight) independent from the head portion. For example, the omnidirectional camera 400 may be fixed to the base plate 328, and be of a configuration that protrudes above the head portion. Because of this, an image filmed by the omnidirectional camera 400 can be detached from movement of the head portion, whereby a computing process for identifying the position of the target object 414 becomes simple, and the processing load thereof can be reduced.

Although not mentioned in the embodiment, the microphone array 404 may also be used in order to recognize the target object 414. The target object 414 may be detected using the microphone array 404, and the direction to the target object 414 may be identified. Also, instead of the microphone array 404 being mounted in the robot 100, microphones may be disposed in multiple places in the robot 100.

An example wherein the robot 100 faces the target object 414 and adjusts distance (mainly by approaching) is shown in the heretofore described embodiment. In a modified example, control may be carried out so that the same distance is obtained when the robot 100 moves away from the target object 414. For example, control may be carried out so that when the robot 100 is followed by the target object 414, the robot escapes while maintaining distance in accordance with the height of the target object 414. In this case, although the robot 100 shows its back to the target object 414, distance can be controlled using an image filmed by the omnidirectional camera 400. Alternatively, the target object 414 approaching from behind the robot 100 may be detected using the omnidirectional camera 400, and control may be executed to change orientation so as to cause the robot 100 to face the target object 414. Further, control that causes the robot 100 to back away, or the like, in accordance with the familiarity of the target object 414 may be executed.

In this case, the line of sight of the robot 100 is basically oriented to the side opposite to that of the target object 414, but in order to simplify a control algorithm, a "hypothetical angle of looking up" that assumes that there is a face on a rear head portion may be set when computing. By so doing, the same kind of setting table as when facing a user can be used. This kind of control can easily be realized by cutting out the imaging screen of the omnidirectional camera 400.

An example wherein distance is adjusted in accordance with the height of the target object 414 is shown in the heretofore described embodiment. In a modified example, distance may be controlled in accordance with a size including a width of the target object 414. The fact that body size is perceived not only from height but also from volume in a width direction is taken into consideration. Control is carried out so as to relatively increase distance from a user with a large body, and to move relatively nearer to a user with a small body. This kind of action largely corresponds to an animal-like action.

In the heretofore described embodiment, the nose of the target object 414 is extracted as the characteristic point, and the height of the nose is identified as the height of the target object 414. In a modified example, the height of the target object 414 may be identified by setting a different characteristic point. For example, an outline of the head portion (face) of the target object 414 may be identified, and a height of an apex portion thereof taken to be the height of the target object 414. Also, in the heretofore described embodiment, the outline of the face is extracted, and the vertical direction length thereof identified as the "face size". In a modified example, for example, a facial area calculated from the outline of the face may be identified as the "face size".

An example wherein a parent and a child are in practically the same position is shown in the heretofore described embodiment as an example of a case in which a multiple of the target object 414 entering the filming region of the camera exist, but the same kind of control can also be carried out when perspective should be considered, as when a multiple of target objects are distanced from each other. For example, when a user C is near the robot 100 and a user D is distanced, the user C is taller, and the face thereof is larger, on the imaging screen. Because of this, distance control is executed with respect to the nearer user. When considering an animal-like action too, reacting to an object near to oneself is natural and logical.

An example wherein, when the robot 100 approaches the target object 414, the drive of the head portion is started when the robot 100 has approached to within a predetermined distance, and the angle of looking up is gradually brought nearer to the set value, is shown in the heretofore described embodiment. In a modified example, the angle of looking up of the robot 100 may be basically fixed, and the robot 100 caused to approach the target object 414 with the angle of looking up unchanged. Further, the robot 100 may be caused to stop when the whole body of the target object 414 enters the angle of view (viewing angle) of the high resolution camera 402. According to this kind of configuration, a frequency of moving the head portion of the robot 100 can be reduced, whereby a control load is reduced.

In the heretofore described embodiment, distance from the target object 414 is controlled so that the angle of looking up θ of the robot 100 is constant. Specifically, the drive of the head portion is started when the robot 100 has approached to within a predetermined distance of the target object 414, the robot 100 itself gradually nears the target object 414 while the angle of looking up is gradually brought nearer to the set value, and the robot 100 stops when the angle of looking up reaches the set value. Consequently, movement of the robot 100 is not controlled by specifically measuring distance. In a modified example, the robot 100 may include a distance measuring sensor that detects a distance to a subject. Further, the distance from the target object 414 (a set distance) when the angle of looking up reaches the set value may be computed, and the robot 100 may be caused to move so that the set distance is achieved. When doing so, information detected by the distance measuring sensor may be successively acquired, and an action of looking up at 414 may be started by driving the head portion from shortly before reaching the set distance. Further, control may be carried out so that the angle of looking up reaches the set value at the timing at which the set distance is reached.

In the heretofore described embodiment, the target object 414 is a user (person), but the target object 414 may include an animal such as a dog or cat. Because of this, a performance such that the robot 100 faces an animal at an appropriate distance can be expressed.

Although not mentioned in the heretofore described embodiment, it is often the case that a camera filming state is a backlit state when the robot 100 performs a looking up action. Because of this, a correction process may be carried out on a filmed image so that the robot 100 can accurately recognize the target object 414 even in a backlit state. Specifically, an exposure correction may be carried out so that the whole of the filmed image becomes brighter. Alternatively, correction that increases exposure (increases brightness) may be carried out except on a bright place in the filmed image. Exposure may be increased centered on a characteristic portion (the face or the like) of the target object 414. Correction using HDR (high-dynamic-range) rendering may be carried out. The recognizing unit 156 may carry out the heretofore described recognition process, such as extracting the characteristics of the target object 414, based on an image after this kind of correction. The filmed image is used in an internal process (image recognition) of the robot 100 rather than being provided to a user, because of which "color skip" and "black-out" of an image portion unrelated to the target object 414 form no particular problem.

Although the omnidirectional camera 400 is shown as an example in the heretofore described embodiment, a 180 degree camera may be employed instead. Alternatively, a configuration may be such that only the portion of the sphere above the omnidirectional camera 400 is a filming target. Note that these omnidirectional and 180 degree cameras are such that distortion of an image filmed thereby (a spherical image) is generally considerable, because of which the recognizing unit 156 preferably carries out image recognition after correction is carried out so that reduces distortion of the spherical image.

When maintaining distance from a target object by keeping an angle of looking up of a robot constant, advancing and withdrawing of the robot are controlled so that a position and a size of an identification region (a face or a characteristic point) of the target object on a screen are maintained. Herein, the "angle of looking up" corresponds to an angle of rotation (also called a "pitch angle") of a pitch shaft. A filming range in up and down directions (looking up and looking down directions) of a camera can be caused to change by adjusting the pitch angle. That is, when controlling the distance from the target object while keeping the angle of looking up of the robot constant, it is sufficient to control movement of the robot so that the identification region of the target object appearing on the screen in a state wherein the pitch angle is constant is maintained in a set region (a set position and a set range) on the screen.

What is claimed is:
1. An autonomously acting robot, comprising:
a camera configured to capture an image of a surrounding of the autonomously acting robot;
a non-transitory computer readable medium configured to store instructions thereon; and
a processor connected to the non-transitory computer readable medium, wherein the processor is configured to execute the stored instructions for:
recognizing a face of an object from the captured image;
controlling an operation of a head portion of the autonomously acting robot to adjust an angle of the head portion to orient a face of the autonomously acting robot toward the recognized face; and
generating instructions for moving, when the head portion faces the recognized face, the autonomously acting robot to a position where the angle of the head portion to be within a predetermined angle range; and
a drive mechanism configured to implement instructions from the processor.

2. The autonomously acting robot according to claim 1, wherein the processor is configured to execute the stored instructions for generating the instructions for moving the autonomously acting robot to the position based on a reference object in response to the captured image including multiple objects, and the reference object is selected based on a height of each object in the captured image.

3. The autonomously acting robot according to claim 1, wherein the processor is configured to execute the stored instructions for selecting the reference object as a shortest object of a plurality of objects in the captured image, wherein a height of each of the plurality of objects is used to determine the shortest object.

4. The autonomously acting robot according to claim 1, wherein the processor is configured to execute the stored instructions for generating the instructions for moving the autonomously acting robot to the position based on a reference object in response to the captured image including multiple objects, and the reference object is selected based on a size of the recognized face in the captured image.

5. The autonomously acting robot according to claim 1, wherein the processor is configured to execute the stored instructions for selecting the reference object from a plurality of objects as having a largest recognized face.

6. The autonomously acting robot according to claim 2, wherein the processor is configured to execute the stored instructions for controlling the autonomously acting robot to face the reference object.

7. The autonomously acting robot according to claim 1, wherein the camera comprises an omnidirectional camera.

8. The autonomously acting robot according to claim 1, wherein the head portion comprises an eye, and the camera is located separate from the eye.

9. The autonomously acting robot according to claim 1, wherein the processor is configured to execute the stored instructions for generating the instructions for moving the autonomously acting robot to the position based on a reference object in response to the captured image including multiple objects, the reference object is selected based on a familiarity of each object in the captured image, and the non-transitory computer readable medium is configured to store the familiarity corresponding to each object.

10. The autonomously acting robot according to claim 1, further comprising a temperature sensor configured to detect a temperature of the object.

11. The autonomously acting robot according to claim 10, wherein the processor is configured to execute the stored instructions for generating the instructions for moving the autonomously acting robot based on a reference object in response to the captured image including multiple objects, the reference object is selected based on the detected temperature.

12. An autonomously acting robot, comprising:
a body portion;
a head portion on the body portion, wherein the head portion is movable relative to the body portion;
a camera configured to capture an image of a surrounding of the autonomously acting robot;
a non-transitory computer readable medium configured to store instructions thereon; and
a processor connected to the non-transitory computer readable medium, wherein the processor is configured to execute the instructions for:
selecting a reference object from a plurality of detected objects in the captured image;
controlling an operation of the head portion of the autonomously acting robot to adjust an angle of the head portion to orient a face of the autonomously acting robot toward a face of the reference object; and
generating instructions for moving, when the head portion faces the recognized face, the autonomously acting robot to control to a position where the angle of the head portion is within a predetermined angle range.

13. The autonomously acting robot according to claim 12, wherein the processor is configured to execute the instructions for recognizing a face of each detected object of the plurality of detected objects based on the captured image.

14. The autonomously acting robot according to claim 13, wherein the processor is configured to execute the instructions for selecting the reference object based on a face size of each detected object of the plurality of detected objects.

15. The autonomously acting robot according to claim 12, wherein the processor is configured to execute the instructions for selecting the reference object based on a height of each detected object of the plurality of detected objects.

16. The autonomously acting robot according to claim 12, wherein the processor is configured to execute the instructions for selecting the reference object based on a detected temperature of each detected object of the plurality of detected objects.

17. The autonomously acting robot according to claim 12, wherein the processor is configured to execute the instructions for selecting the reference object based on a familiarity of each detected object of the plurality of detected objects.

18. A server configured to communicate with an autonomously acting robot, the server comprising:
a non-transitory computer readable medium configured to store instructions thereon; and
a processor connected to the non-transitory computer readable medium, wherein the processor is configured to execute the instructions for:
receiving an image of a surrounding of the autonomously acting robot;
selecting a reference object from a plurality of detected objects in the received image;
transmitting instructions for controlling an operation of a head portion of the autonomously acting robot to adjust an angle of the head portion to orient a face of the autonomously acting robot toward a face of the reference object; and
transmitting instructions for moving, when the head portion faces the recognized face, the autonomously acting robot to a position where the angle of the head portion relative to the body portion is within a predetermined angle range, wherein the predetermined angle range is set based on a stored familiarity associated with the reference object.

19. The server according to claim 18, wherein the processor is configured to execute the instructions for recognizing a face of each object of the plurality of objects based on the received image, and transmitting the instructions for controlling the operation of the head portion based on the recognized face of each object of the plurality of objects.

20. The autonomously acting robot according to claim 1, wherein the processor is configured to:
detect multiple objects from the captured image; and
select a reference object from the detected multiple objects, wherein generating the instructions for moving comprises controlling a distance between a body portion of the autonomously acting robot and the reference object.

* * * * *